(12) United States Patent
Husemann et al.

(10) Patent No.: US 6,652,963 B2
(45) Date of Patent: Nov. 25, 2003

(54) PRESSURE SENSITIVE ADHESIVE, PARTICULARLY FOR APOLAR SURFACES

(75) Inventors: Marc Husemann, Hamburg (DE); Stephan Zöllner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 0 days.

(21) Appl. No.: 10/152,089

(22) Filed: May 21, 2002

(65) Prior Publication Data

US 2003/0096111 A1 May 22, 2003

(30) Foreign Application Priority Data

Jun. 20, 2001 (DE) ......................... 101 29 609

(51) Int. Cl.$^7$ ............................. B32B 27/30
(52) U.S. Cl. ............... 428/355 AC; 525/89; 526/319; 526/931; 528/272; 156/332
(58) Field of Search ............ 428/355 AC; 522/127; 525/89; 526/319, 931; 528/272; 156/332

(56) References Cited

U.S. PATENT DOCUMENTS

| | | | | |
|---|---|---|---|---|
| 5,314,962 A | * | 5/1994 | Otsu et al. ................ | 525/280 |
| 5,900,473 A | * | 5/1999 | Acevedo et al. ........... | 528/271 |
| 5,962,577 A | * | 10/1999 | Mori et al. ................. | 524/512 |
| 6,177,524 B1 | * | 1/2001 | Ohtsuka et al. ........... | 525/531 |

* cited by examiner

*Primary Examiner*—Robert Dawson
*Assistant Examiner*—Christopher M. Keehan
(74) *Attorney, Agent, or Firm*—Norris McLaughlin & Marcus

(57) ABSTRACT

A pressure sensitive adhesive based on block copolymers which have at least one unit composed of a series of three alternating polymer blocks P(A) and P(B), wherein P(A) represents a homopolymer or copolymer block formed from a component A which itself comprises at least one acrylated macromonomer of general formula $$CH_2=CH(R')(COOR'')\qquad (I)$$

in which $R'$=H or $CH_3$ and $R''$ is an aliphatic linear, branched or cyclic, unsubstituted or substituted, saturated or unsaturated, alkyl radical having more than 30 carbon atoms, and the average molecular weight $M_n$ of said at least one macromonomer being between 492 g/mol and 30 000 g/mol, P(B) represents a homopolymer or copolymer block formed from a monomeric component B which itself comprises at least one monomer B1, the polymer block P(B) having a softening temperature of from −80° C. to +20° C., and the polymer blocks P(A) being immiscible with the polymer blocks P(B).

19 Claims, No Drawings

PRESSURE SENSITIVE ADHESIVE, PARTICULARLY FOR APOLAR SURFACES

The invention relates to pressure sensitive adhesives based on block copolymers, said block copolymers comprising at least the unit P(A)-P(B)-P(A), composed of a middle polymer block P(B) and of two polymer blocks P(A) surrounding the middle polymer block P(B), or the unit P(B)-P(A)-P(B), composed of a middle polymer block P(A) and of two polymer blocks P(B) surrounding the middle polymer block P(A), to the use of such adhesives, and to a process for preparing them.

In industry, hotmelt processes operating with solventless coating technology are of growing importance in the preparation of pressure sensitive adhesives. In general, environmental regulations and increasing costs are forcing forward the development process of such adhesives. Besides SIS (styrene-isoprene-styrene copolymers) systems, acrylic polymers are increasingly being applied from the melt as a polymer film to backing materials. Moreover, for specialty applications, pressure sensitive adhesive tapes which feature very low outgassing are needed. This is something which can be ensured only by means of hotmelt processes, since conventional coatings applied from solution always still contain small fractions of residual solvent.

Additionally, there is a growing need for acrylic pressure sensitive adhesives on apolar surfaces. In industry, the use of plastics is on the increase, owing to the weight reduction they offer as compared with conventional metals, and, accordingly, adhesive bonds are being formed more and more on these substrates. Since the large number of their ester groups makes polyacrylates relatively polar, bond strength can be increased only by using resins of similar polarity. Although these resins exhibit good bond strength on polar surfaces such as steel, their bond strengths to apolar surfaces are mediocre and inadequate for the majority of applications.

U.S. Pat. No. 4,418,120 A describes crosslinked pressure sensitive adhesives comprising rosin ester resins, which possess good bond strength to polypropylene. Owing to the unsaturated nature of the resin, however, the UV stability of these adhesives is poor. The bond strengths to the apolar surfaces as well are relatively low.

U.S. Pat. No. 4,726,982 A describes crosslinked pressure sensitive adhesives featuring high bond strength to inks and paints. The copolymers of acrylic esters and N-vinyl-2-pyrrolidone are blended with tackifiers such as poly (isobornyl methacrylate), pentaerythritol esters of rosins, and mixed aliphatic/aromatic resins.

Here again, relatively polar resins are used to increase the bond strength to apolar surfaces. The tackifiers mostly described, however, possess unsaturated compounds which, in the hotmelt process, can lead to, instances of gelling; additionally, after bonding, the unsaturated compounds undergo aging or weathering under UV light and, accordingly, the adhesive properties suffer over a prolonged period of time.

In EP 0 707 604 A1, polyethylene/butylene macromonomers are used for copolymerization with acrylates. As a result, phases are formed which have a low glass transition temperature, which in turn allow the adhesives to flow on apolar surfaces and thus ensure high bond strengths to PE and PP. A disadvantage is the poor conversion of the polymerization process described. Furthermore, the macromonomers are copolymerized randomly, and so no domains are able to form. Such domains would offer regions in which even very apolar resins would be soluble. With these pressure sensitive adhesive tapes, therefore, only a relatively low bond strength to apolar surfaces is attained.

Furthermore, the polyacrylates described are very difficult to process as hotmelts because the high residual monomer fractions impact negatively on the concentration process, and migration within the pressure sensitive adhesive tape can have an adverse effect on the long-term adhesive properties.

In contrast, styrene-isoprene-styrene (SIS) block copolymers are widespread as elastomers for hotmelt-processable pressure sensitive adhesives [preparation processes:

U.S. Pat. No. 3,468,972 A; U.S. Pat. Nos. 3,595,941 A; use in pressure sensitive adhesives: 3,239,478 A; U.S. Pat. No. 3,935,338 A] with high bond strength to apolar surfaces. Their effective processability is achieved by means of a relatively low molecular weight and by means of a specific morphology [EP 0 451 920 B1]. These pressure sensitive adhesives can be crosslinked very effectively with UV light in the presence of photoinitiators or with electron beams, since the middle blocks contain a large number of double bonds.

Nevertheless, these elastomers are not without their disadvantages, such as, for example, severe aging under UV light (i.e., in daylight too) and in an oxygen/ozone atmosphere. Moreover, owing to the formation of hard block domains comprising the hard polystyrene end blocks, effective flow on apolar surfaces is prevented. The same applies to other block copolymers which possess a middle block containing at least one double bond [U.S. Pat. No. 5,851,664 A].

Another very unfavorable property of styrene-isoprene-styrene block copolymers for the application is the relatively low thermal shear strength. These pressure sensitive adhesives, accordingly, are unsuited to applications within relatively high temperature ranges.

U.S. Pat. No. 5,314,962 A describes A-B-A block copolymers as elastomers for adhesives, which possess A domain formation as their cohesion-forming feature. As a result of the selection of the comonomers used, however, only low bond strengths can be realized on apolar surfaces. Additionally, these polymers are not compatible with highly apolar resins.

EP 0 921 170 A1 describes A-B-A block copolymers which have been modified with additions of resin. Here again, owing to the selection of the comonomers and added resins, only low bond strengths can be realized on apolar surfaces.

EP 0 408 429 A1 and EP 0 408 420 A1 described A-B-A block copolymers which, however, were synthesized by living anionic polymerization. Because of the absence of an acrylic acid fraction, however, these polymers are unsuited to use as pressure sensitive adhesives, since the internal cohesion of the middle block is too low and at least a low fraction of polar monomers is required for bonds to steel. Because of the anionic polymerization, it is not possible to use acrylic acid comonomers or other hydroxyl-functionalized acrylate comonomers, such as hydroxyethyl acrylate, for example. And, again, highly efficient flow on apolar surfaces is prevented by the use of the conventional domain-forming polymers, such as PMMA or polystyrene.

In U.S. Pat. No. 5,166,274 A, this acrylic acid deficiency is compensated by hydrolyzing block copolymers of tert-butyl methacrylate in order to liberate the carboxylic acid function. On the industrial scale, however, this method cannot be applied to pressure sensitive adhesives, since the hydrolysis step is very costly and time consuming.

In U.S. Pat. No. 6,069,205 A1, diblock and triblock copolymers are described which are prepared by an atom transfer polymerization and utilized for adhesives. This method too is unsuitable for preparing pressure sensitive adhesives, since it uses relatively high catalytic amounts of heavy metal compounds which would have to be removed, in a cumbersome operation, by extraction processes.

EP 1 008 640 A1 describes styrene block copolymers comprising an acrylate middle block composed, however, of the common $C_2$ to $C_{14}$ alkyl acrylates. Because of the restriction of the comonomers and, associated therewith, the restriction of the resins which can be used, only low bond strengths to apolar substrates are achievable with these polymers. Moreover, metal salts are used to prepare these polymers too (in analogy to U.S. Pat. No. 6,069,205 A), which would have to be removed, again a cumbersome operation, for pressure sensitive adhesive tape applications.

It is an object of the invention to provide improved pressure sensitive adhesives based on polyacrylate which do not have the disadvantages of the prior art, or in which said disadvantages are reduced.

Surprisingly and unforeseeably for the skilled worker, this object is achieved by the inventive pressure-sensitive adhesives as specified in the claims. The main claims relate in particular to pressure sensitive adhesives which have an aging behavior better than that of SIS compositions, a bond strength to apolar surfaces which is higher than that of the conventional, prior art A-B-A polyacrylate pressure sensitive adhesives, and an excellent compatibility with very apolar resins.

The invention accordingly provides a pressure sensitive adhesive based on block copolymers, said block copolymers having at least one unit composed of three successive polymer blocks, said three successive polymer blocks being chosen in alternation from the group of the polymer blocks P(A) and P(B), wherein P(A) represents a homopolymer or copolymer block obtainable from a component A which is composed of at least one monomer A1, said at least one monomer A1 being an acrylated macromonomer of the general formula $$CH_2=CH(R^I)(COOR^{II}) \qquad (I)$$

in which $R^I$=H or $CH_3$ and $R^{II}$ is an aliphatic linear, branched or cyclic, unsubstituted or substituted, saturated or unsaturated alkyl radical having more than 30 atoms, the average molecular weight $M_n$ of said at least one macromonomer being between 492 g/mol and 30 000 g/mol, P(B) represents a homopolymer or copolymer block obtainable from a component B which is composed of at least one monomer B1, the polymer block P(B) having a softening temperature of from −80° C. to +20° C., and the polymer blocks P(A) are not homogeneously miscible with the polymer blocks P(B).

Accordingly, the block copolymers of the inventive pressure sensitive adhesive comprise at least the unit P(A)-P(B)-P(A) composed of a middle polymer block P(B) and of two polymer blocks P(A) enclosing the middle polymer block P(B), and/or the structural unit which is inverse to this, i.e., at least the unit P(B)-P(A)-P(B) composed of a middle polymer block P(A) and of two polymer blocks P(B) enclosing the middle polymer block P(A), subject to the above-described provisos for the polymer blocks P(A) and P(B).

The block copolymers for the pressure sensitive adhesive of the invention can be prepared and used to advantage in a very wide variety of structures. Explicitly, reference may be made to linear or branched chains of the polymer blocks P(A) and P(B), corresponding for example to a general structure $[P(A)\text{-}P(B)]_n$, to star polymers of P(A) and P(B), corresponding for example to the general structures $[[P(A)\text{-}P(B)]_n]_m X$ or $[[P(B)\text{-}P(A)]_n]_m X$ or $[[P(A)\text{-}P(B)]_n]_m X[P(A)\text{-}P(B)]_p]_q$, or to the general structures $[[P(A)\text{-}P(B)]_n]_m XL_p$ or $[[P(B)\text{-}P(A)]_n]_m XL_p$, in which L here can denote different radicals. The enumeration of these structures is intended only by way of example, without representing any limitation. The structures also embrace all of the "asymmetric" structures in which all of the polymer blocks P(A) and P(B) meet per se the definitions set out above, but in which the indices n, m, p and q imply only the multiple occurrence of the individual units but not their chemical or structural identity. L can with preference be radicals which, for example, represent poly(meth)acrylates but which do not inherently have a block structure. Also included here are homopolymers of the components A or B.

In one procedure which is advantageous in the sense of the invention, macromonoers A1 used comprise hydrogenated ethylene/propylene macromonomers and/or hydrogenated ethylene/butylene macromonomers which possess a glass transition temperature of not more than 0° C. and carry an acrylate or methacrylate end group.

One very preferred example used is Kraton L-1253™ (Shell AG). Kraton Liquid L-1253™ (Shell AG) is a macromonomer having a molecular weight of 4 000 g/mol, is methacrylate functionalized, and possesses a saturated poly(ethylene/butylene) unit as aliphatic side chain.

In a procedure which is very advantageous in the sense of the invention, the macromonomers used comprise aliphatic acrylates, such as triacontanyl acrylate, and also higher homologs.

In order to obtain good immiscibility of the polymer blocks P(A) and of the polymer blocks P(B) it is of advantage to make these blocks highly different in polarity and so to ensure optimum phase formation. It is therefore advantageous to choose preferably apolar monomers as a further monomers of component A for the synthesis of the polymer blocks P(A).

For improved phase separation it is also possible to copolymerize monomers having a high glass transition temperature for the polymer blocks P(A). Advantageous examples which are used as comonomers for component A1 are vinylaromatics, methyl methacrylates, cyclohexyl methacrylates, and isobornyl methacrylates. Particularly preferred examples are methyl methacrylate and styrene.

As component A it is also possible to use mixtures of the above-described macromonomers with the monomers set out below that are used to form the polymer blocks P(B), provided the mixing proportions are chosen so that the phase separation of the polymer blocks P(A) and P(B) is still ensured.

In an advantageous development of the pressure sensitive adhesive of the invention, component B is composed at least in part of monomers B1 which are chosen from the following groups:

(a) acrylic and methacrylic acid derivatives of the general formula $$CH_2=CH(R^{III})(COOR^{IV}) \qquad (II)$$

in which $R^{III}$=H or $CH_3$ and $R^{IV}$ represents a linear or branched aliphatic alkyl chain having from 2 to 20, preferably from 4 to 14, in particular from 4 to 9 carbon atoms, (b) vinyl compounds, especially those which have one or more functional groups capable of crosslinking, component B being composed in particular of from 60 to 100% by weight of compounds from group (a) and from 0 to 40% by weight of compounds from group (b).

In one advantageous variant of the pressure sensitive adhesive of the invention, it is possible for group (a) to use acrylic monomers of the general formula (II) in which the group —OR$^{IV}$ constitutes or comprises a functional group for crosslinking of the pressure sensitive adhesive.

Preferred examples of group (a) monomers are n-butyl acrylate, n-pentyl acrylate, n-hexyl acrylate, n-heptyl acrylate, n-octyl acrylate, n-nonyl acrylate and their branched isomers, such as 2-ethylhexyl acrylate, for example. Furthermore, the methacrylates corresponding to the abovementioned acrylates are among preferred examples of the group (a) monomers. Compounds which lend themselves outstandingly to use as group (a) monomers are, additionally, isobutyl acrylate, isooctyl acrylate, and isobornyl acrylate.

Vinyl compound group (b) monomers here are all monomers containing a vinylogous double bond capable of polymerization, especially those in which this double bond is activated for polymerization by functional groups. In this sense it is also possible to classify (meth)acrylates within the group of the vinyl monomers. In respect of group (b) it is preferred to use monomers which lower the glass transition temperature of the polymer block P(B), alone or in combination with other monomers, especially those from groups (a) or (b), to below 20° C.

In one very advantageous embodiment of the invention, at least one of the monomers of component B, especially at least one of the group (b) monomers, is chosen such that it contains one or more functional groups which can be used for a crosslinking reaction of the block copolymer, especially for a thermal or radiation-chemical crosslinking, and, very particularly, for a crosslinking which is induced and/or assisted by UV radiation or by irradiation with electron beams.

With particular advantage, these can be (meth)acrylic derivatives containing unsaturated alkyl radicals in the radical R$^{VI}$, of the general formula

$$CH_2=CH(R^V)(COOR^{VI}) \quad (III)$$

in which R$^V$=H or CH$_3$. Preferred for R$^{VI}$ are alkyl radicals having from 3 to 14 carbon atoms which contain at least one C-C double bond. For acrylates modified with double bonds, allyl acrylate and acrylated cinnamates are particularly advantageous.

Additionally here and with great preference it is also possible to use acrylic monomers of the general formula (III) in which the group —OR$^{VI}$ represents another functional group for crosslinking of the adhesive or comprises one or more further and/or different functional groups for crosslinking of the adhesive.

Moreover, it is also possible, very advantageously, to use as group (b) monomers vinyl compounds having further double bonds which do not react during the (radical) polymerization. Particularly preferred examples are isoprene and butadiene.

Preferred examples of group (b) monomers further include vinyl acetate, acrylamides, photoinitiaters functionalized with at least one double bond, tetrahydrofuryl acrylate, hydroxy-functionalized (meth)acrylates, carboxyl-functionalized (meth)acrylates, amine- or amide-functionalized (meth)acrylates, and also vinyl esters, vinyl ethers, vinyl halides, vinylidene halides, vinyl compounds containing aromatic ring systems and heterocyclic systems in α position, especially vinyl acetate, vinylformamide, vinylpyridine, ethyl vinyl ether, vinyl chloride, vinylidene chloride, and acrylonitrile.

As group (b) monomers it is also possible to use, with advantage, hydroxyethyl acrylate, hydroxypropyl acrylate, hydroxyethyl methacrylate, hydroxypropyl ethacrylate, acrylic acid, methacrylic acid, allyl alcohol, maleic anhydride, itaconic anhydride, itaconic acid, benzoin acrylate, acrylated benzophenone, acrylamide, and glycer-idyl methacrylate.

In another very advantageous embodiment of the inventive pressure sensitive adhesive, functional groups capable of crosslinking are introduced which are capable of a crosslinking reaction under the effect of thermal energy. Greatly preferred in this context are hydroxyl, carboxyl, epoxy, amide, acid isocyanato or amino groups.

For preparing the block copolymers used for the pressure sensitive adhesives of the invention it is possible in principle to use any polymerization which proceeds in accordance with a controlled-growth radical mechanism, such as, for example, GTRP (group-transfer radical polymerization), ATRP (atom-transfer radical polymerization), nitroxide/ TEMPO controlled polymerization or, very preferably, the RAFT process (raid addition fragmentation chain transfer) or a modified RAFT process.

Alternatively, the polymers may also be prepared by a living anionic polymerization, sequentially or using a difunctional initiator. A prerequisite for this is that the monomers used do not include any compounds which might interrupt or terminate the anionic polymerization.

The polymerization can be conducted in the presence of an organic solvent or in the presence of water, or in mixtures of organic solvents and/or water, or else without solvent. It is preferred to use as little solvent as possible. Depending on conversion, temperature, and method, the polymerization time is between 6 and 72 hours.

In the case of solution polymerization, the solvents used are preferably esters of saturated carboxylic acids (such as ethyl acetate), aliphatic hydrocarbons (such as n- hexane or n-heptane), ketones (such as acetone or methyl ethyl ketone), aromatic solvents (such as toluene or xylene), special boiling point spirit, or mixtures of these solvents. For polymerization of the very apolar macromonomers it is very preferable to use for polymer block P(A) apolar solvents, such as aliphatic hydrocarbons or special boiling point spirits. For polymerization in aqueous media or in mixtures of organic and aqueous solvents, it is preferred to add emulsifiers and stabilizers for the polymerization. Polymerization initiators used are customary radical-forming compounds such as, for example, peroxides, azo compounds, and peroxosulfates. Initiator mixtures are also outstandingly suitable.

If the polymers are prepared by TEMPO- or nitroxide-controlled controlled-growth radical polymerization, then for the purpose of radical stabilization, nitroxides of type (IVa) or (IVb) are used:

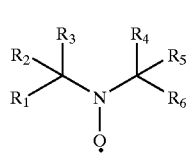

(IVa)

-continued

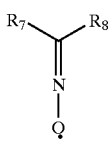
(IVb)

in which $R_1$, $R_2$, $R_3$, $R_4$, $R_5$, $R_6$, $R_7$, and $R_8$ independently of one another denote the following compounds or atoms:
- i) halides, such as chlorine, bromine or iodine
- ii) linear, branched, cyclic, and heterocyclic hydrocarbons having from 1 to 20 carbon atoms, which can be saturated, unsaturated, and aromatic,
- iii) esters —COOR$_9$, alkoxides —OR$_{10}$ and/or phosphonates —PO(OR$_{11}$)$_2$, in which $R_9$, $R_{10}$ and $R_{11}$ are radicals from group ii).

The compounds (IVa) or (IVb) may also be attached to polymer chains of any kind and can therefore be used for constructing the block copolymers, as macroradicals or macroregulators.

As controlled regulators for the polymerization it is more preferred to use compounds of the following types:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxy (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl-1-dibenzylphosphono-2,2-dimethylpropyl nitroxide N-(1-phenyl-2-methylpropyl) 1-diethylphosphono-1-methylethyl nitroxide di-t-butyl nitroxide diphenyl nitroxide t-butyl t-amyl nitroxide.

As a further controlled polymerization method, use may be made of atom transfer radical polymerization (ATRP), in which preferably monofunctional or difunctional secondary or tertiary halides are used as initiators and the halide(s) is (are) abstracted using complexes of Cu, Ni, Fe, Pd, Pt, Ru, Os, Rh, Co, Ir, Cu, Ag or Au [EP 0 824 111 A1; EP 0 826 698 A1; EP 0 824 110 A1; EP 0 841 346 A1; EP 0 850 957 A1]. The various possibilities of ATRP are described further in the documents U.S. Pat. Nos. 5,945,491 A, 5,854,364 A, and 5,789,487 A.

The block copolymer can also be prepared by anionic polymerization. In this case the reaction medium used preferably comprises inert solvents, such as aliphatic and cycloaliphatic hydrocarbons, or else aromatic hydrocarbons, for example.

The living polymer is generally represented by the structure P(B)-M, in which M is a metal from Group I of the Periodic Table, such as lithium, sodium or potassium, for example. The molecular weight of the polymer is determined by the ratio of initiator to monomer. In order to construct the block structure, the monomers for block P(A) are added, after which the monomer(s) for block P(B) is (are) added in order to prepare the polymer block P(B)-P(A)-P(B). Alternatively, P(B)-P(A)-M can be coupled by a suitable difunctional compound. In this way, star block copolymers [P(B)-P(A)]$_n$X are also obtainable. Examples of suitable polymerization initiators include n-propyllithium, n-butyllithium, 2-naphthyllithium, cyclohexyllithium and octyllithium, without wishing this enumeration to constitute any unnecessary restriction.

Furthermore, it is also possible to use difunctional initiators, such as 1,1,4,4-tetraphenyl-1,4-dilithiobutane or 1,1,4,4-tetraphenyl-1,4-dilithioisobutane. Coinitiators can also be used. Examples of suitable coinitiators include lithium halides, alkali metal alkoxides, and alkylaluminum compounds. This technique is also known as ligated anionic polymerization.

As a very preferred variant for the preparation a modified RAFT process (reversible addition-fragmentation chain transfer) is carried out. The RAFT process is described in detail in the documents WO 98/01478 A1 and WO 99/31144 A1, although the reaction regime described could not be used to prepare any materials suitable for pressure sensitive adhesives. Suitable with particular advantage for preparing the block copolymers used for the pressure sensitive adhesives of the invention are trithiocarbonates [Macromolecules 2000, 33, 243–245], in which case, in a first step, monomers for the end blocks are polymerized and, in a second step, the middle block is polymerized. Following the polymerization of the end blocks, the reaction can be terminated and reinitiated. As a result of repeated initiation the conversion achieved—in contrast to the original RAFT process—is good, so that the block copolymers prepared can also be used as acrylic pressure sensitive adhesives. It is also possible to carry out polymerization sequentially without interrupting the reaction. In one very advantageous variant, the trithiocarbonate (V) is used for the polymerization, particularly of acrylates:

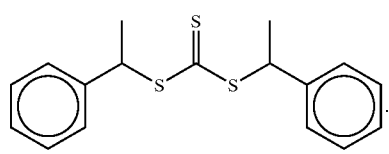
(V)

More suitable for the polymerization of methacrylates are trithiocarbonates of types (VI) and (VII)

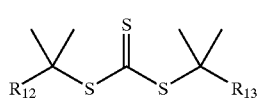
(VI)

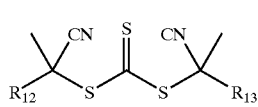
(VII)

in which $R_{12}$ and $R_{13}$ can be identical or different and comprise H, methyl, halides such as chlorine, bromine or iodine, for example, linear, branched, cyclic, and heterocyclic hydrocarbons having 2 to 20 carbon atoms, which can be saturated, unsaturated or aromatic, esters —COOR, alkoxides —OR and heterocycles having up to 20 carbon atoms.

The block copolymer used for the pressure sensitive adhesives of the invention is processed further conventionally from solution or from the melt. For processing from the melt, the block copolymer is removed from the solvent in a concentrative extruder under reduced pressure, in which case it is possible, for example, to use single-screw or twin-screw extruders. Twin-screw extruders can with advantage be operated in corotating or counterrotating mode.

For the inventive pressure sensitive adhesive it is of advantage if the block copolymers have an average molecular weight $M_n$ (numerical average) of between 5 000 and 600 000 g/mol, in particular between 80 000 and 450 000 g/mol.

The fraction of the polymer blocks P(B) is preferably between 10 and 60% by weight, in particular between 50 and 40% by weight, of the overall block copolymer.

For its advantageous further development, up to 50% by weight, in particular from 20 to 40% by weight, of resins are added to the pressure sensitive adhesive of the invention. Examples of resins that can be used include terpene resins, terpene-phenolic resins, $C_5$ and $C_9$ hydrocarbon resins, pinene resins, indene resins, and rosins, alone or in combination with one another. In principle, though, it is possible to use any resins which are soluble in the corresponding polymer; in particular, mention may be made of all aliphatic, aromatic and alkylaromatic hydrocarbon resins, hydrocarbon resins based on pure monomers, hydrogenated hydrocarbon resins, functional hydrocarbon resins, and natural resins.

For a very preferred development, highly apolar hydrogenated or partly hydrogenated hydrocarbon resins are admixed to the block copolymer, and take up residence preferentially in the P(A) domains. As a commercially available resin, mention may be made here of Regalite R 91™ from Hercules.

Independently of the admixture of resin, it may further be advantageous to add further additives, particularly compounding agents, aging inhibitors, light stabilizers, ozone protectants, fatty acids, plasticizers, expandants, accelerators and/or fillers (for example, carbon black, $TiO_2$, solid or hollow beads of glass or other materials, nucleators).

Additionally and optionally, crosslinkers are added to the block copolymer. Suitable crosslinkers include, for example, metal chelates, polyfunctional isocyanates, polyfunctional amines or polyfunctional alcohols. It is also possible to use polyfunctional acrylates with advantage as crosslinkers for actinic radiation.

Alternatively, UV photoinitiators are added to the block copolymers. Useful photoinitiators whose use is very favorable include benzoin ethers, such as benzoin methyl ether and benzoin isopropyl ether, for example, substituted acetophenones, such as 2,2-diethoxyacetophenone (available as Irgacure 651 from Ciba Geigy), 2,2-dimethoxy-2-phenyl-1-phenylethanone, dimethoxyhydroxyacetophenone, for example, substituted alpha-ketols, such as 2-methoxy-2-hydroxypropiophenone, for example, aromatic sulfonyl chlorides, such as 2-naphthylsulfonyl chloride, for example, and photoactive oximes, such as 1-phenyl-1,2-propanedione 2-(O-ethoxycarbonyl)oxime, for example. Additionally, polymers used for the pressure sensitive adhesives of the invention can be UV-crosslinked directly, without adding UV photoinitiators, if photoinitiators have been copolymerized in the polymer. In general, coinitiators or accelerators assist the crosslinking. It is possible to use all UV-crosslinking-accelerating substances which are known to the skilled worker.

A further development which makes the process for preparing the pressure sensitive adhesives of the invention particularly advantageous for the preparation of, for example, adhesive tapes is distinguished by the further processing of the blended pressure sensitive adhesive from solution or the melt and by its application in particular to a backing.

Usable backing materials for adhesive tapes, for example, include those materials which are customary and familiar to the skilled worker, such as films (polyester, PET, PE, PP, BOPP, PVC), webs, foams, wovens and scrimmed films, and also release paper (glassine, HDPE, LDPE). This list is not intended to be conclusive.

In the case of crosslinking of the pressure sensitive adhesive, said adhesive is treated preferably with actinic radiation. Crosslinking of the hotmelt pressure sensitive adhesives of the invention takes place by brief UV exposure in the range from 200 to 400 nm using commercial high or medium pressure mercury lamps with an output of, for example, from 80 to 200 W/cm, or by means of thermal crosslinking within a temperature range between 70 and 140° C., or by means of ionizing radiation, such as by electron beam curing, for example. For UV crosslinking it may be appropriate to adapt the lamp output to the belt speed or, in the case of slow travel, to partially shade off the belt in order to reduce its heat exposure. The exposure time depends on the model and output of the radiation sources in question.

The invention further provides for the use of a pressure sensitive adhesive as described above for an adhesive tape provided on one or both sides with the pressure sensitive adhesive, particularly for an adhesive tape for bonds to apolar surfaces, said adhesive tape being produced preferably by applying the pressure sensitive adhesive from the melt to a backing.

Finally, the invention also embraces a process for preparing a pressure sensitive adhesive as set out hereinabove, in which the block copolymer is prepared by a thioester- or thiocarbonate-controlled radical polymerization.

EXAMPLES

The purpose of the examples below is to illustrate the invention, without wishing to subject it to any unnecessary restriction.

Commercially Available Chemicals Employed

| Substance | Manufacturer | Chemical composition |
|---|---|---|
| Vazo 67 | DuPont | 2,2'-azobis(2-ethylpropionitrile) |
| Regalite R91 | Hercules | fully hydrogenated hydrocarbon resin, $M_n$ = 500 g/mol, polydispersity = 1.4 Softening range: 85–91° C. |

Test Methods

Shear Strength (Test TA)

A strip of adhesive tape 13 mm wide was applied to a smooth, cleaned steel surface. The area of application measured 20 mm×13 mm (length×width). Subsequently, at room temperature, a 1 kg weight was fastened to the adhesive tape, and the time until the weight fell off was recorded.

The shear adhesion times recorded are each recorded in minutes and correspond to the average of three measurements.

180° Bond Strength Test (Test TB1 TB2)

A strip 20 mm wide of an acrylic pressure sensitive adhesive applied to a polyester layer was applied in turn to PE (TB1) or PP (TB2) plates. The pressure sensitive adhesive strip was pressed down twice onto the substrate using a 2 kg weight. The adhesive tape was then immediately removed from the substrate at an angle of 180° and a speed of 300 mm/min. All of the measurements were conducted at room temperature under controlled-climate conditions.

The results are reported in N/cm and are averaged from three measurements.

Gel Permeation Chromatography

The determination of the average molecular weight $M_n$ (number average molecular weight) and $M_w$ (weight average molecular weight) has been realized by gel permeation chromatography (size exclusion chromatography).

eluent: THF/0.1 Vol. % Trifluoroacetic acid
precolumn: PSS—SDV, 5μ, ID 8.0 mm×50 mm
column: PSS-SDV, 5μ linear one, $10^3$, $10^5$, and $10^6$ each with ID 8.0 mm×300 mm
pump: TSP P 100
flux: 1.0 ml/min
concentration of the probe: 4 g/l
injection system: TSP AS 3000; volume of injected probe 100 μl
temperature; 25° C.
detector: Shodex RI 71
internal standard: toluene Differential Scaning Colorimetry (DSC)

Softening temperatures are given as results from dynamic methods, such as differential scanning calorimetry, at room temperature.
Preparation of the Trithiocarbonate:
As a regulator, the following trithiocarbonate (IV) was prepared in accordance with Macromolecules 2000, 33, 243–245 and Synth. Commun. 1988, 18, 1531–1536.

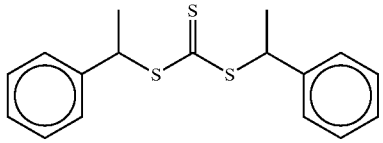

(IV)

Polymerization Procedure

Example 1

A 1 000 ml polymerization reactor equipped with a heating bath, a reflux condenser, a nitrogen inlet tube and an anchor stirrer was charged with 400 g of triacontanyl acrylate, 133 g of special boiling point spirit 60/95, 0.12 g of Vazo 67™ (from DuPont), 15 g of acetone and 2.00 g of the trithiocarbonate (IV). The reactor was degassed three times and then the polymerization was carried out under nitrogen. For initiation, the mixture was heated to 75° C. and polymerization was carried out with stirring for 4 hours. Reinitiation was then carried out with 0.12 g of Vazo 67™ (DuPont). After 48 hours the polymerization was terminated and the batch was cooled to RT for isolation.

The polymer was then transferred to a 4 L polymerization reactor for conventional radical polymerizations and the polymer was diluted with 330 g of butyl acrylate, 20 g of acrylic acid, 50 g of methyl acrylate, 100 g of acetone and 200 g of special boiling point spirit. After nitrogen gas had been passed through for 20 minutes and the reactor degassed twice, it was heated to 80° C. with stirring. At a product temperature of 60° C., 0.12 g of Vazo 67™ (DuPont) were added. After 2 hours, reinitiation was carried out with 0.12 g of Vazo 67™; after 4 hours, the mixture was diluted with 200 g of special boiling point spirit and 50 g of acetone, and reinitiated with 0.2 g of Vazo 67™, and after 24 hours the polymerization was terminated.

For isolation, the batch was cooled to RT, the block copolymer was diluted to 40% with acetone/special boiling point spirit (1:2) and then blended with 20 parts by weight of Regalite R91™ (Hercules), based on the polymer fraction. The acrylic block copolymer was freed from the solvent mixture in a vacuum drying cabinet and then coated from the melt onto a Saran-primed PET backing, 23 μm thick, at an application rate of 50 g/m² from a slot die, then irradiated with electrons at 50 kGy and at acceleration voltage of 200 kV (EB unit from Crosslinking). The product was then tested in accordance with methods TA, TB1 and TB2.

Example 2

The procedure of example 1 was repeated. The acrylic block copolymer was blended with parts by weight of Regalite R91™ (Hercules), based on the polymer fraction. After coating from the melt, testing was carried out in accordance with methods TA, TB1 and TB2.

Example 3

A 1 000 mL polymerization reactor equipped with a heating bath, a reflux condenser, a nitrogen inlet tube and an anchor stirrer was charged with 360 g of triacontanyl acrylate, 40 g of isobornyl methacrylate, 133 g of special boiling point spirit 60/95, 0.12 g of Vazo 67™ (from DuPont), 15 g of acetone and 2.00 g of the trithiocarbonate (IV). The reactor was degassed three times and then the polymerization was carried out under nitrogen. For initiation, the mixture was heated to 75° C. and polymerization was carried out with stirring for 4 hours. Reinitiation was then carried out with 0.12 g of Vazo 67™ (DuPont). After 48 hours the polymerization was terminated and the batch was cooled to RT for isolation.

The polymer was then transferred to a 4 L polymerization reactor for conventional radical polymerizations and the polymer was diluted with 635 g of 2-ethylhexyl acrylate, 40 g of acrylic acid, 100 g of N-tert-butylacrylamide, 15 g of maleic anhydride, 10 g of Ebecryl P36, 150 g of acetone and 300 g of special boiling point spirit.

After nitrogen gas had been passed through for 20 minutes and the reactor degassed twice, it was heated to 80° C. with stirring. At a product temperature of 60° C., 0.20 g of Vazo 67™ (DuPont) were added. After 2 hours, reinitiation was carried out with 0.20 g of Vazo 67™; after 3 hours, the mixture was diluted with 300 g of special boiling point spirit 60/95 and 100 g of acetone, after 6 hours it was diluted with 200 g of special boiling point spirit 60/95 and 100 g of acetone, and reinitiated with 0.2 g of Vazo 67™, and after 24 hours the polymerization was terminated.

For isolation, the batch was cooled to RT, the block copolymer was diluted to 40% with acetone/special boiling point spirit (1:2) and then blended with 20 parts by weight of Regalite R91™ (Hercules), based on the polymer fraction. The acrylic block copolymer was freed from the solvent mixture in a vacuum drying cabinet and then coated from the melt onto a Saran-primed PET backing, 23 μm thick, at an application rate of 50 g/m² from a slot die. The specimens produced were irradiated in 6 passes through a UV unit from Eltosh, equipped with a medium pressure mercury lamp, at a belt speed of 20 m/min. The product was then tested in accordance with methods TA, TB1 and TB2.

Example 4

The procedure of example 3 was repeated. The acrylic block copolymer was blended with 30 parts by weight of Regalite R91™ (Hercules), based on the polymer fraction. After coating from the melt, testing was carried out in accordance with methods TA, TB1 and TB2.

Example 5

A 1 000 mL polymerization reactor equipped with a heating bath, a reflux condenser, a nitrogen inlet tube and an anchor stirrer was charged with 400 g of triacontanyl acrylate, 133 g of special boiling point spirit 60/95, 0.12 g of Vazo 67™ (from DuPont), 15 g of acetone and 2.00 g of the trithiocarbonate (IV). The reactor was degassed three times and then the polymerization was carried out under nitrogen. For initiation, the mixture was heated to 75° C. and polymerization was carried out with stirring for 4 hours. Reinitiation was then carried out with 0.12 g of Vazo 67™ (DuPont). After 48 hours the polymerization was terminated and the batch was cooled to RT for isolation.

The polymer was then transferred to a 4 L polymerization reactor for conventional radical polymerizations and the polymer was diluted with 635 g of 2-ethylhexyl acrylate, 40 g of acrylic acid, 100 g of N-tert-butylacrylamide, 15 g of maleic anhydride, 10 g of benzoin acrylate, 150 g of acetone and 300 g of special boiling point spirit.

After nitrogen gas had been passed through for 20 minutes and the reactor degassed twice, it was heated to 80° C. with stirring. At a product temperature of 60° C., 0.20 g of Vazo 67™ (DuPont) were added. After 2 hours, reinitiation was carried out with 0.20 g of Vazo 67™; after 3 hours, the mixture was diluted with 300 g of special boiling point spirit 60/95 and 100 g of acetone, after 6 hours it was diluted with 200 g of special boiling point spirit 60/95 and 100 g of acetone, and reinitiated with 0.2 g of Vazo 67™, and after 24 hours the polymerization was terminated.

For isolation, the batch was cooled to RT, the block copolymer was diluted to 40% with acetone/special boiling point spirit (1:2) and then blended with 30 parts by weight of Regalite R91™ (Hercules), based on the polymer fraction. The acrylic block copolymer was freed from the solvent mixture in a vacuum drying cabinet and then coated from the melt onto a Saran-primed PET backing, 23 μm thick, at an application rate of 50 g/m² from a slot die. The specimens produced were irradiated in 6 passes through a UV unit from Eltosh, equipped with a medium pressure mercury lamp, at a belt speed of 20 m/min. The product was then tested in accordance with methods TA, TB1 and TB2.

Example 6

A 1 000 mL polymerization reactor equipped with a heating bath, a reflux condenser, a nitrogen inlet tube and an anchor stirrer was charged with 400 g of triacontanyl acrylate, 133 g of special boiling point spirit 60/95, 0.12 g of Vazo 67™ (from DuPont), 15 g of acetone and 2.00 g of the trithiocarbonate (IV). The reactor was degassed three times and then the polymerization was carried out under nitrogen. For initiation, the mixture was heated to 75° C. and polymerization was carried out with stirring for 4 hours. Reinitiation was then carried out with 0.12 g of Vazo 67™ (DuPont). After 48 hours the polymerization was terminated and the batch was cooled to RT for isolation.

The polymer was then transferred to a 4 L polymerization reactor for conventional radical polymerizations and the polymer was diluted with 300 g of n-butyl acrylate, 300 g of 2-ethylhexyl acrylate, 40 g of acrylic acid, 100 g of methyl acrylate, 15 g of maleic anhydride, 85 g of ethyl acetate, 150 g of acetone and 300 g of special boiling point spirit 60/95.

After nitrogen gas had been passed through for 20 minutes and the reactor degassed twice, it was heated to 80° C. with stirring. At a product temperature of 60° C., 0.20 g of Vazo 67™ (DuPont) were added. After 2 hours, reinitiation was carried out with 0.20 g of Vazo 67™; after 3 hours, the mixture was diluted with 300 g of special boiling point spirit 60/95 and 100 g of acetone, after 6 hours it was diluted with 200 g of special boiling point spirit 60/95 and 100 g of acetone, and reinitiated with 0.2 g of Vazo 67™, and after 24 hours the polymerization was terminated.

For isolation, the batch was cooled to RT, the block copolymer was diluted to 35% with acetone/special boiling point spirit (1:2) and, blended with 0.3 part by weight of aluminum acetylacetonate, based on the polymer, then blended with 20 parts by weight of Regalite R91™ (Hercules), based on the polymer fraction, and then coated onto a Saran-primed, 23 μm thick PET backing using a coating bar with a conventional doctor blade. The product was then dried in a drying oven at 120° C. for 10 minutes. The application rate to the backing material thereafter was 50 g/m². The product was then tested in accordance with methods TA, TB1 and TB2.

Example 7

A 4 000 mL polymerization reactor equipped with a heating bath, a reflux condenser, a nitrogen inlet tube and an anchor stirrer was charged with 850 g of 2-ethylhexyl acrylate, 850 g of n-butyl acrylate, 50 g of acrylic acid, 50 g of N-tert-butylacrylamide, 133 g of special boiling point spirit 60/95, 500 g of acetone and 10 g of trithiocarbonate (IV). The reactor was degassed three times and then the polymerization was carried out under nitrogen. For initiation, the reaction mixture was heated to 70° C. and 0.80 g of Vazo 67™ (DuPont) was added. After a polymerization time of 2 hours, reinitiation was carried out using 0.80 g of Vazo 67™ (DuPont). After 5 and 10 hours, the batch was diluted in each case with 600 g of acetone/special boiling point spirit (4:1). After a reaction time of 48 hours, 200 g of triacontanyl acrylate and 133 g of special boiling point spirit 60/95 were added and reinitiation was carried out using 0.4 g of Vazo 67™ (DuPont). After a further 12-hour reaction period, reinitiation was again carried out with 0.4 g of Vazo 67™ (DuPont) and, after 48 hours of reaction, the polymerization was terminated and the product was cooled to room temperature.

The block copolymer was diluted to 30% with special boiling point spirit, blended with 0.3 part by weight of aluminum acetylacetonate, based on the polymer, and blended with 15 parts by weight of Regalite R91™ (Hercules), based on the polymer fraction, and then coated onto a Saran-primed, 23 μm thick PET backing using a coating bar with a conventional doctor blade. It was subsequently dried in a drying oven at 120° C. for 10 minutes. The application rate to the backing material thereafter was 50 g/m². The product was then tested in accordance with methods TA, TB1 and TB2.

Results

The table below lists the technical properties of the adhesives prepared in examples 1 to 7.

| Example | SAT RT/TA | BS to PE/TB1 | BS to PP/TB2 |
|---------|-----------|--------------|--------------|
| 1 | 582 | 6.2 | 7.0 |
| 2 | 420 | 6.6 | 7.8 |
| 3 | 466 | 6.1 | 6.9 |
| 4 | 398 | 6.0 | 7.2 |
| 5 | 502 | 6.1 | 7.0 |
| 6 | 607 | 5.1 | 5.4 |
| 7 | 1254 | 5.2 | 6.2 |

SAT: shear adhesion time in minutes
BS: bond strength in N/cm

Examples 1 and 2 demonstrate that high bond strengths to apolar surfaces can be realized using the inventive acrylic pressure sensitive adhesives containing Regalite R91™. The adhesives were applied as hotmelts (from the melt) and crosslinked using electron beams. Examples 3 and 4 were likewise applied from the melt but were crosslinked using UV light. Here again, somewhat higher bond strengths to PE and PP were obtained with 30% Regalite R91™. Example 5 possesses a somewhat different comonomer composition, but was likewise blended with 20% Regalite R91™, coated from the melt and crosslinked using UV light. Example 6, on the other hand, was applied from solution and crosslinked thermally with an aluminum chelate. Here again, bond strengths of 6 N/cm to PE and PP were realized with 20% Regalite R91™. Example 7 possesses a relatively small aliphatic fraction and an inversely constructed block structure P(B)-P(A)-P(B). This polymer as well was coated from solution and crosslinked thermally with aluminum chelate.

All of the pressure sensitive adhesives prepared are very clear and transparent, despite the fact that Regalite R91™ is a highly apolar resin and is not normally compatible with polyacrylates.

We claim:

1. A pressure sensitive adhesive based on block copolymers, said block copolymers having at least one unit composed of a series of three alternating polymer blocks, each of which blocks are selected from the group consisting of P(A) and P(B), wherein P(A) represents a homopolymer or copolymer block formed from a component A which itself comprises at least one monomer A1, said at least one monomer A1 being an acrylated macromonomer of general formula $$CH_2=CH(R')(COOR'') \quad (I)$$

in which $R'$=H or $CH_3$ and $R''$ is an aliphatic linear, branched or cyclic, unsubstituted or substituted, saturated or unsaturated, alkyl radical having more than 30 carbon atoms, and the average molecular weight $M_n$ of said at least one macromonomer being between 492 g/mol and 30 000 g/mol, P(B) represents a homopolymer or copolymer block formed from a monomeric component B which itself comprises at least one monomer B1, the polymer block P(B) having a softening temperature of from −80° C. to +20° C., and the polymer blocks P(A) being immiscible with the polymer blocks P(B).

2. The pressure sensitive adhesive of claim 1, wherein monomer A1 is selected from the group consisting of hydrogenated ethylene/propylene macromonomers and hydrogenated ethylene/butylene macromonomers which possess a softening temperature of not more than 0° C. and have an acrylate or methacrylate end group.

3. The pressure sensitive adhesive of claim 1, wherein component B is composed at least in part of monomers B1 selected from the following groups:
(a) acrylic and methacrylic acid derivatives of the general formula $$CH_2=CH(R''')(COOR^{IV}) \quad (II)$$

in which $R'''$=H or $CH_3$ and $R^{IV}$ represents a linear or branched aliphatic alkyl chain having from 2 to 20 carbon atoms,
(b) vinyl compounds,
component B being composed of from 60 to 100% by weight of compounds from group (a) and from 0 to 40% by weight of compounds from group (b).

4. The pressure sensitive adhesive of claim 3, wherein at least one of the monomers of component B contains one or more functional groups through which the block copolymer is crosslinkable.

5. The pressure sensitive adhesive of claim 1, wherein the polymer blocks P(B) of component B form a two-phase domain structure with the copolymer blocks P(A) of component A.

6. The pressure sensitive adhesive of claim 1, wherein the block copolymers have an average molecular weight (number average) of between 5 000 and 600 000 g/mol.

7. The pressure sensitive adhesive of claim 1, wherein the polymer blocks P(B) comprise between 10 and 60% by weight of the overall block copolymer.

8. The pressure sensitive adhesive as of claim 1, comprising
up to 50% by weight of resins, and/or additives selected from the group consisting of crosslinkers, aging inhibitors, light stabilizers, ozone protectants, fatty acids, plasticizers, nucleators, expandants, accelerators and fillers.

9. An adhesive tape comprising the pressure sensitive adhesive of claim 1.

10. A process for preparing the pressure sensitive adhesive of claim 1, which comprises preparing the block copolymer by means of a thioester- or trithiocarbonate-controlled radical polymerization.

11. The pressure sensitive adhesive of claim 3, wherein said linear or branched aliphatic alkyl chain has from 4 to 14 carbon atoms.

12. The pressure sensitive adhesive of claim 11, wherein said linear or branched aliphatic alkyl chain has from 4 to 9 carbon atoms.

13. The pressure sensitive adhesive of claim 3, wherein said vinyl groups comprise one or more functional groups capable of crosslinking.

14. The pressure sensitive adhesive of claim 4, wherein said at least one of the monomers of component B is a monomer of group (b) and said block copolymer is crosslinkable by thermal or radiation-chemical crosslinking.

15. The pressure sensitive adhesive of claim 14, wherein said block copolymer is crosslinkable by UV radiation or electron-beam radiation.

16. The pressure sensitive adhesive of claim 6, wherein said molecular weight is between 80,000 and 450,000 g/mol.

17. The pressure sensitive adhesive of claim 7, wherein said polymer blocks P(B) comprise between 15–40% by weight of the overall block copolymer.

18. The pressure sensitive adhesive of claim 8, wherein said weight percent is from 20 to 40%.

19. A method of bonding an adhesive tape to an apolar surface, which comprises bonding said apolar surface with the adhesive tape of claim 9.

* * * * *